United States Patent [19]

Behan

[11] Patent Number: 4,818,233

[45] Date of Patent: Apr. 4, 1989

[54] RELIGIOUS INSTRUCTION KIT

[75] Inventor: Hugh F. J. Behan, 3314 Country Club Dr., Box 1107, Jefferson City, Mo. 65102

[73] Assignee: Hugh F. J. Behan, Jefferson City, Mo.

[21] Appl. No.: 15,400

[22] Filed: Apr. 14, 1987

[51] Int. Cl.$^4$ .............................................. G09B 19/00

[52] U.S. Cl. ........................................ 434/245; 428/3; 446/268; 446/479; D11/122

[58] Field of Search ............................ 434/245; 428/3; 446/268, 482, 479; D21/114; D11/122

[56] References Cited

U.S. PATENT DOCUMENTS

| | | | |
|---|---|---|---|
| D. 288,701 | 3/1987 | Behan | D21/114 |
| 1,814,251 | 7/1931 | King | 434/245 |
| 3,885,342 | 5/1975 | Morrison | 446/268 X |

*Primary Examiner*—William H. Grieb

[57] ABSTRACT

A set of figures and objects used to teach children about the proceedings in religious worship services. The figures represent participants and the objects represent altar vessels and the like. The figures and objects are particularly useful in teaching about the Roman Catholic church and churches with a similar liturgical tradition.

5 Claims, 4 Drawing Sheets

RELIGIOUS INSTRUCTION KIT

WE GO TO CHURCH, a set of figures, clothes, furniture and furnishings to help young children experience and learn about the worship service of the Roman Catholic Church, and other Christian Churches, through their own imaginative playing and the guidance of older persons, particularly teachers and parents. The set is also designed to help parents and teachers explain worship to their children and classes by providing models of the elements adnd figures and a printed teaching guide.

The set is designed to be used with the Model Church for which I have already received U.S. Pat. Des. No. 288,701, Model Church, Mar. 10, 1987 but it can be used by itself.

BRIEF DESCRIPTION OF THE DRAWING

FIGS. 1 and 5 represent children, FIGS. 2 and 4 represent adults and FIG. 3 represents a baby;

FIG. 6 shows a chair, FIG. 7 shows a podium or pulpit, FIG. 8 shows an altar, FIG. 9 shows a baptismal font and FIG. 10 shows a pulpit hanging;

FIGS. 11 and 16 show candle sticks, FIG. 12 shows a book, FIG. 13 shows cruets for wine and water, FIG. 14 shows a chalice and FIG. 15 shows a communion dish;

FIG. 17 shows a priest; and

FIG. 18 shows a liturgical vestment.

Figure 5:
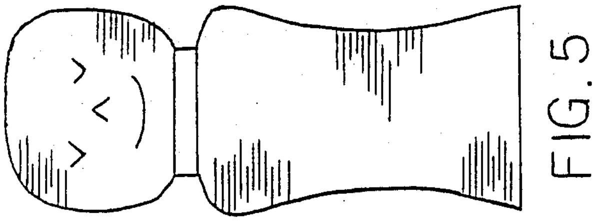
FIGS. 1–5 show a set of model figures at a worship service.
Figure 4:
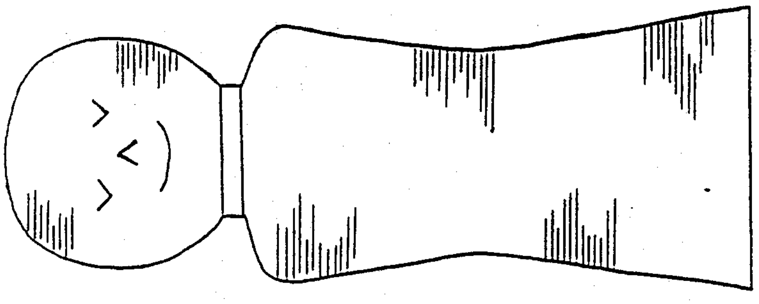

The WE GO TO CHURCH set includes an altar 7, pulpit (podium) 8, tabernacle 9 (container for the Communion bread between services and for the sick), ). baptismal font 10, chair 11. The altar vessels include a communion cup (chalice) 14, communion plate 15, cruets 16, 17 for wine and water, two candle sticks 18, 19.

The set also includes a book 20 which serves several functions: as a lectionary, for the Bible readings; a sacramentary, for the prayers of the Mass; a ritual for the other sacraments; a pontifical for ceremonies involving the bishop such as ordination or confirmation.

Figure 3:
Figure 2:
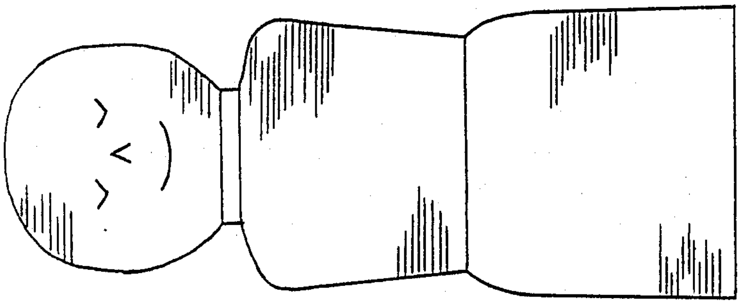
Figure 1:
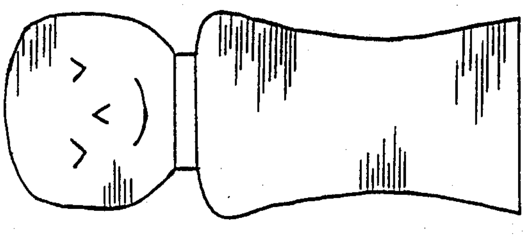
Figure 10:
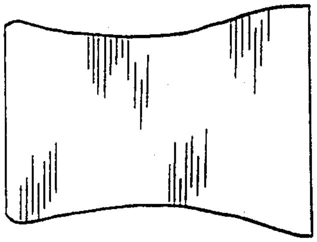
FIGS. 6–10 show a set of model pieces.
Figure 9:
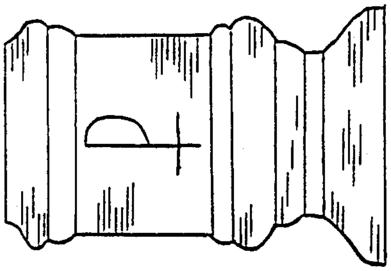
Figure 8A:
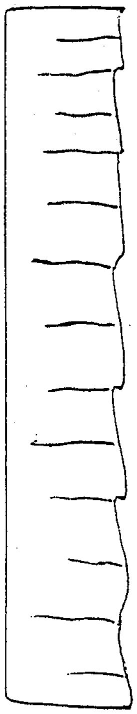
FIG. 8A shows an altar cloth.
Figure 8:
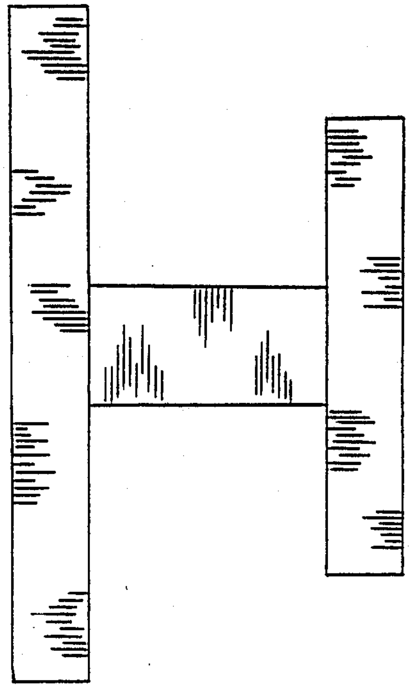
Figure 7A:
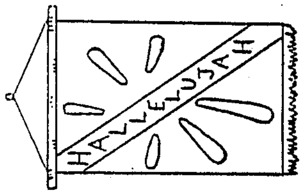
FIG. 7A shows a tabernacle.
Figure 7:
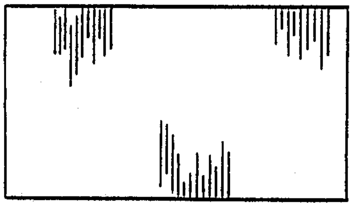
Figure 6:
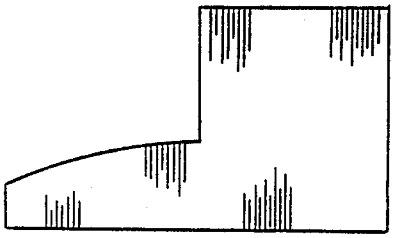
Figure 16:
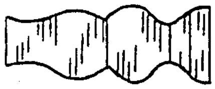
FIGS. 11–18 shows a set of model objects.
Figure 15:
Figure 14:
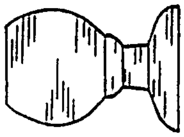
Figure 13:
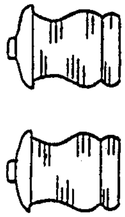
Figure 12:
Figure 11:
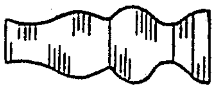
Figure 18:
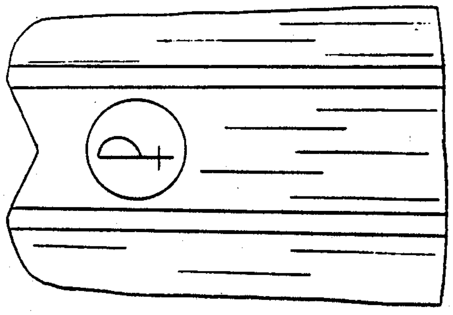
Figure 17:
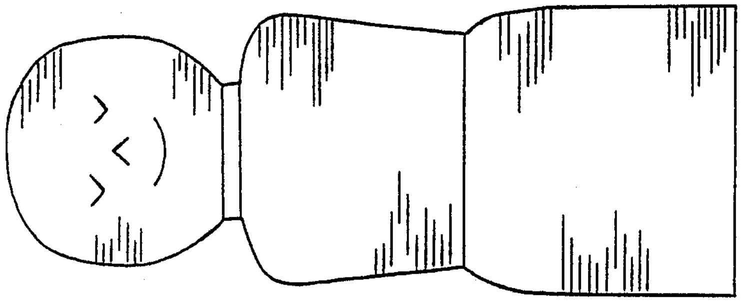

Human figures in the set include a priest 1, two other adult figures 2, 3, two children 4, 6, a baby 6.

The set also includes a vestment 21 (robe) and stole for the priest; an altar cloth 12; a pulpit hanging 13; two pictures, one of the Head of Christ and the other of Christ with Children.

The set can be used for use in the Roman Catholic Church and in several other Churches which have much of the same liturgical tradition, such as the Episcopal, Presbyterian, United Church of Christ, Methodist. The set can also be adapted for use by those with less of a liturgical tradition, such as Baptists, because it shows people at worship.

A teaching guide is included with the set for use in the home, the classroom or other teaching opportunity. It describes the elements, explains them and shows how the Eucharist (Communion Serice, Mass or the Lord's Supper) can be dramatized. It also provides samples of other vestments, decorations and furnishings which can be made by a teacher and class or a family at home. They include a wedding veil, first communion veil for girls, first communion suit for boys, a bishop's miter, a deacon's stole. There is an explanation of the different parts of the liturgical year (Christmas, Lent, Easter, Pentecost, Ordinary Time) and the various colors used for each season. Drawings of symbols used for various sacraments or different aspects of the Christian Faith are also provided for children to learn from or make themselves.

There are no moving parts and nothing to be assembled in WE GO TO CHURCH.

I claim:

1. A religious instruction kit to teach children about worship services, rituals and sacraments, comprising:

a first set of model pieces representing an altar, a pulpit, a tabernacle and a baptismal font;

a second set of model figures representing a priest and people;

and a third set of model objects representing altar objects used in a worship service;

the second and third sets being freely movable in both lateral and transverse directions with respect to the altar piece;

whereby the model figures and objects may be located and moved with respect to the model pieces to depict various positions of priest, people and objects during the course of the worship service.

2. The kit of claim 1, wherein the figures representing the people include a plurality of adults, a plurality of children and a baby.

3. The kit of claim 1, wherein the third set of model objects representing altar objects include a communion cup, a communion plate, wine and water cruets, candle sticks and a book.

4. The kit of claim 1, wherein the worship service depicted is that of the Roman Catholic Church.

5. A method of teaching religious worship services and rituals, comprising the steps of:

providing a first set of model pieces representing an alter, a pulpit, a tabernacle and a baptismal font;

providing a second set of model figures representing a priest and people;

providing a third set of model objects representing altar objects used in a worship service;

and locating and moving the model figures and objects in both lateral and transverse directions with respect to the model pieces to depict the various positions of the priest and people, and of the altar vessels represented by the model figures and objects during the course of the worship service.

* * * * *